(12) United States Patent
Lee et al.

(10) Patent No.: US 8,531,956 B2
(45) Date of Patent: Sep. 10, 2013

(54) CHANNEL ASSIGNMENT FOR A WIRELESS NETWORK

(75) Inventors: Jung Gun Lee, Palo Alto, CA (US); Gene Cheung, Tokyo (JP); Sung-Ju Lee, San Francisco, CA (US); Puneet Sharma, Palo Alto, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 253 days.

(21) Appl. No.: 12/790,814

(22) Filed: May 29, 2010

(65) Prior Publication Data

US 2011/0292886 A1 Dec. 1, 2011

(51) Int. Cl.
*H04L 12/16* (2006.01)
*H04W 4/00* (2009.01)
*H04W 72/00* (2009.01)
*H04J 3/14* (2006.01)
*G06F 15/173* (2006.01)

(52) U.S. Cl.
USPC .......... 370/235; 370/329; 370/341; 370/437; 455/450; 709/226

(58) Field of Classification Search
USPC ................ 370/229–238, 310–350, 400–411, 370/431–463; 455/434, 445, 449–454, 464; 709/223–232, 238–244
See application file for complete search history.

(56) References Cited

U.S. PATENT DOCUMENTS

| | | | | |
|---|---|---|---|---|
| 7,136,655 | B2 * | 11/2006 | Skafidas et al. | 455/450 |
| 7,181,527 | B2 * | 2/2007 | Valenci et al. | 709/234 |
| 7,327,697 | B1 * | 2/2008 | Friday et al. | 370/278 |
| 7,453,844 | B1 * | 11/2008 | Lee et al. | 370/329 |
| 7,457,261 | B2 * | 11/2008 | Theobold et al. | 370/328 |
| 7,555,301 | B2 * | 6/2009 | Skafidas et al. | 455/450 |
| 7,643,469 | B2 * | 1/2010 | Alicherry et al. | 370/351 |
| 7,653,396 | B2 * | 1/2010 | van der Gaast et al. | 455/450 |
| 7,720,483 | B2 * | 5/2010 | Kim et al. | 455/447 |
| 7,769,854 | B2 * | 8/2010 | Yan et al. | 709/224 |
| 7,970,011 | B2 * | 6/2011 | Carlson et al. | 370/468 |
| 8,064,921 | B2 * | 11/2011 | Mishra et al. | 455/452.2 |
| 8,169,885 | B2 * | 5/2012 | Li et al. | 370/203 |
| 2006/0072502 | A1 * | 4/2006 | Crandall et al. | 370/329 |
| 2006/0291432 | A1 | 12/2006 | Anton et al. | |
| 2009/0034457 | A1 * | 2/2009 | Bahl et al. | 370/329 |

* cited by examiner

*Primary Examiner* — Tri H Phan

(57) ABSTRACT

Channel assignment for access points (APs) in a wireless network includes determining at least one of a MaxSum and a MaxMin, and determining a channel assignment for the APs based on at least one of the MaxSum and the MaxMin. The MaxSum is a maximization of a system throughput and the system throughput is a sum of throughput of nodes in the network. The MaxMin is a maximization of a minimum throughput of a set of AP-client links in the network. The AP-client link is a link between an AP and a client associated with the AP.

20 Claims, 6 Drawing Sheets

CHANNEL ASSIGNMENT FOR A WIRELESS NETWORK

BACKGROUND

A client in a wireless local area network (WLAN) associates with an access point (AP) to get connectivity, for example, to and from the Internet, and to further communicate with other clients via the WLAN. A client typically relies on one AP at any given time for all communications in the WLAN. Also, each AP in the WLAN is assigned a channel, and the clients connected to the AP use the channel to communicate with the AP. A channel may be a channel as defined by a standard, such as an 802.11 standard. The channel may be a frequency band.

When there are multiple APs, the channels used by each of the APs should be carefully assigned so that neighboring APs do not interfere with each other. Therefore, most channel assignment processes consider the interference relationship between APs. However, a client associated with an AP can interfere with another AP or can interfere with clients connected to different APs, even when the APs do not interfere with each other. Hence, conventional channel assignment processes are highly susceptible to interference caused by clients connected to neighboring APs, especially when the WLAN is dense. This can result in failed or degraded network performance that can seriously impact real-time applications, such as voice-over-IP or streaming video and also impact the performance of non-real-time applications.

BRIEF DESCRIPTION OF THE DRAWINGS

Features of the present invention will become apparent to those skilled in the art from the following description with reference to the figures, in which.

DETAILED DESCRIPTION

Figure 1:
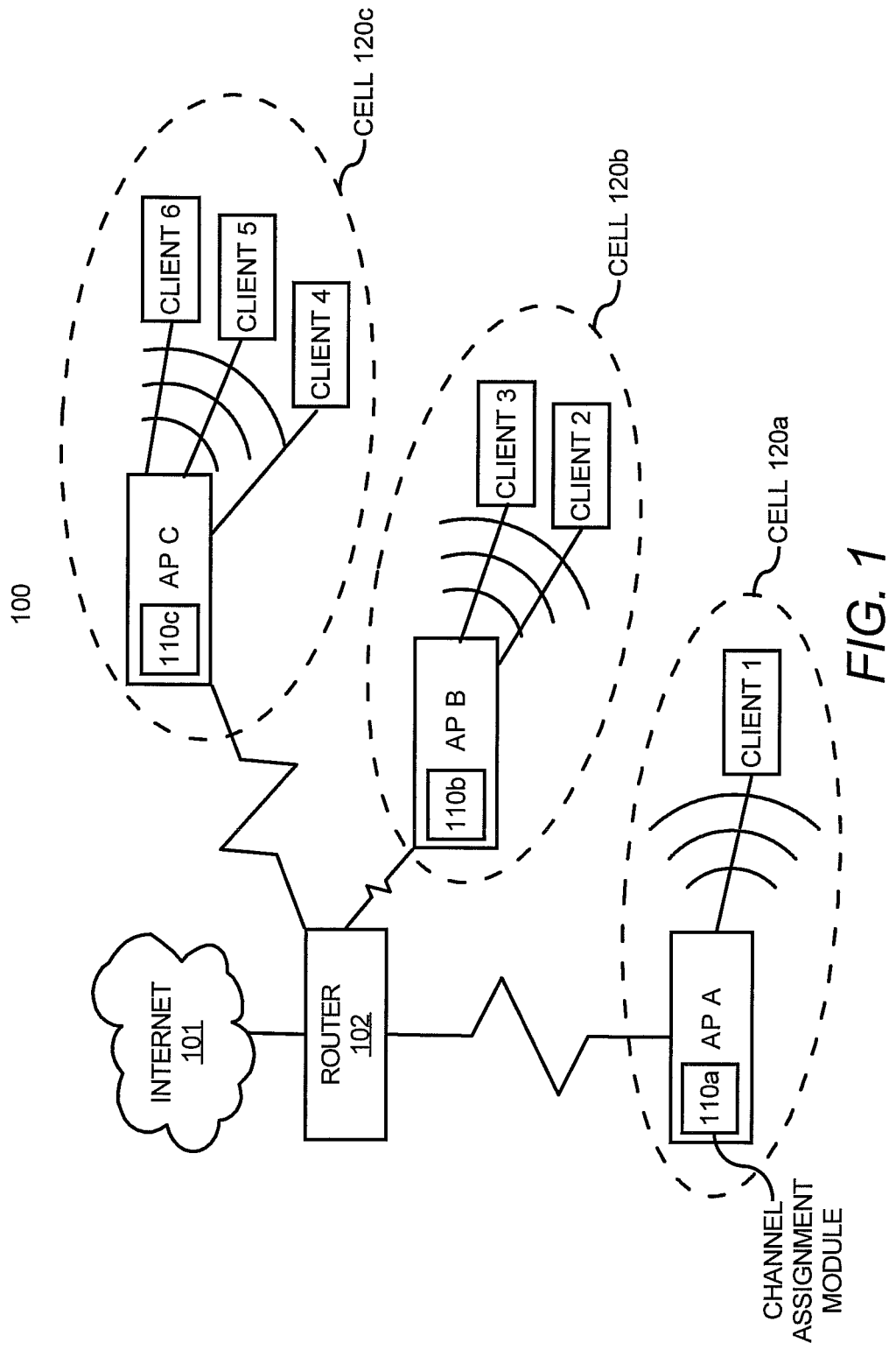
FIG. 1 shows a system, according to an embodiment of the present invention.

For simplicity and illustrative purposes, the present invention is described by referring mainly to exemplary embodiments. In the following description, numerous specific details are set forth to provide a thorough understanding of the embodiments. However, it will be apparent to one of ordinary skill in the art that the present invention may be practiced without limitation to these specific details. In other instances, well known methods and structures have not been described in detail to avoid unnecessarily obscuring the description of the embodiments.

1. Overview

According to an embodiment, a channel assignment process uses a MaxSum and/or a MaxMin to assign channels to APs and clients associated with the APs to achieve a performance objective in a network (e.g., a WLAN). A channel assignment may include assigning a channel to each AP in the network. A channel assignment may include one channel assigned per AP, so multiple clients associated with a single AP share the same assigned channel. Throughput is the amount of data transferred in one direction over a link, such as between a client and an AP, divided by the time taken to transfer it, usually expressed in bits or bytes per second. The MaxSum is a sum of throughput of nodes in the network that maximizes a system throughput. The system throughput is the sum of throughput for the nodes. The MaxSum may be based on a particular channel assignment that maximizes system throughput when comparing different system throughputs that may be achieved through different channel assignments. The MaxMin is a maximization of a minimum throughput of the nodes in the network, and may be based on a particular channel assignment. A minimum throughput of a node is the smallest normalized throughput of the node, for example, when comparing different throughputs that may be achieved through different channel assignments. The channel assignment process, according to an embodiment, determines the MaxSum and/or MaxMin to improve fairness of throughput among different clients and/or for maximizing the overall throughput of the network by mitigating interference. This includes mitigating interference between clients and between a client and a neighboring AP. This also includes scheduling time slots for each client associated with an AP to communicate on the channel assigned to the AP.

The channel assignment process may be used with different standards, including the 802.11n standard. 802.11n is an emerging WLAN technology that provides two channel bandwidth options, 20 MHz and 40 MHz The 40 MHz channel enables an AP and its associated clients to communicate with each other by using two adjacent 20 MHz channels. Due to the increased (doubled) channel bandwidth, the AP and its clients benefit from the increased bandwidth. However, the wider channel also increases the potential for interference. The channel assignment process takes into consideration the effects (e.g., increased bit rate and increased interference) of channel bonding on the client throughput.

2. System

FIG. 1 illustrates a block diagram of a system 100, according to an embodiment of the present invention. The system 100 includes a WLAN 110 connected to the Internet 101. The WLAN 110 may be connected to an access network or any wide area network (WAN) or other network, and not just the Internet 101.

The WLAN 110 includes a router 102, multiple APs, shown as APs A-C, and multiple clients 1-6. Cells 120*a-c*, including an AP and its associated client(s) are shown. More or less than three APs, more routers and more or less clients may exist in the WLAN 110. The number of network devices shown is for illustration purposes.

An AP is a device that allows wireless communication devices, such as clients, to connect to a wireless network using a standard, such as an 802.11 standard or other type of standard. The APs A-C include network interfaces equipped for interfacing with the router 102, another network outside the WLAN 110 (e.g., the Internet or an access network) via the router 102, and the clients 1-6. The APs A-C may connect to the router 102 through a wireless or wired connection. A client is a device that can connect to a WLAN via a network interface, and may include an end user device, such as a laptop, desktop computer, cell phone, etc. The wireless network interface is commonly referred to as a radio.

In FIG. 1, each of the clients 1-6 is wirelessly connected to one of the APs A-C. Each of the clients 1-6 and one of the APs A-C may form an AP-client link. For example, an AP-client link of the AP C and the client 4, an AP-client link of the AP C and the client 5, and an AP-client link of the AP C and the client 6 form a set of AP-client links. The clients 1-6 may be connected to the Internet 101 via one of the APs A-C and the router 102. For example, the clients 1-6 may receive different types of data flows, such as VoIP, multiplayer game data, streaming video or audio, or bulk transfer of data.

The APs A-C include channel assignment modules 110a-c performing channel assignment among the APs A-C. The channel assignment modules 110a-c may determine a Max-Sum, a MaxMin, a maximal independent set and a normalized throughput for channel assignment, as is further described below. The channel assignment modules 110a-c may perform the channel assignment process to assign channels to each of the APs A-C to minimize interference between APs and between clients and between clients and APs. In another embodiment, the channel assignment process may be performed by a central unit or server that gathers all the network information and assigns channels, and notifies the APs of the channel assignment.

3. Inputs of Channel Assignment Process

The inputs for the channel assignment process include a set of APs, a set of clients connected to the APs, the AP-to-client associations, node-to-node interference relationships, and a set of available channels. These inputs are predetermined prior to the execution of the channel assignment process. Link-to-link interference relationships may be generated based on the node-to-node interference relationships, the AP-to-client associations, and the channel assignment. Each input is described below.

3a. Sets of Clients and APs (i.e., Nodes)

A node is a client or AP in a wireless network such as a WLAN. Thus, the nodes include the APs and clients connected to the APs in the WLAN. An AP includes one or more clients connected to the AP. The clients connected to an AP are referred to as associated with the AP. As described below, a client communicates with only one AP at a given time and all clients associated with the same AP communicate on the same channel. The APs are wireless APs that allow clients to connect to the WLAN. The clients are wireless devices that include a wireless network interface (i.e., radio) that can communicate with the AP or other wireless devices using a predetermined standard, such as 802.11 or other standard.

The WLAN may be represented as an undirected graph $G=(V;E;L)$ where $V=\{v_1, \ldots v_n\}$ represents the set of all nodes in the WLAN; $E=\{e_1, \ldots e_m\}$ is the set of m bi-directional edges (AP-to-client associations) and L is the set of bi-directional interference links. In bi-directional edges, if node $v_i$ hears node $v_j$, node $v_j$ also hears node $v_i$. In one embodiment, uni-directional edges may be used. The n nodes consist of two disjoint sets: a set of clients S and a set of APs A, where $A=V-S$. There are m clients out of all n nodes and the number of APs is n-m. Thus, n is always larger than m. An edge e only exists between an AP and a client and the edge means that the client is associated with the AP. Thus, each client has only one edge that connects to its associated AP and each client can communicate only with its AP unless the client disconnects with the AP and subsequently connects to another AP. Data communication takes place between an AP and its associated client. An AP and all its associated clients are operating in the same channel. Also, assume the AP-to-client association does not change during the channel assignment process.

A directional communication link, $I: v_s-v_r$ is defined if and only if one of $v_s$ and $v_r$ is a station and the other node is the AP that the station is associated to. A station is a client associated with an AP. The set of defined links is L because links that communication goes in both directions are considered. If a link $I: v_s-v_r$ exist, its reverse link $I': v_s-v_r$ always exists because a station and its associated AP need to talk to each other. A global scheduler (not shown) schedules the transmission of each link. The global scheduler may be located in the channel assignment modules 110a-c. In another embodiment, the global scheduler may be a part of a central unit or server that gathers all the network information and schedules the transmission of each link, and notifies the APs of the transmission schedule of each link. The transmission schedule for each link $I_i$: $v_s-v_r$, $\pi_i$, is given in the form of a set of $T_i$ tuples:

$$\pi_i = \{[s_{i,1}, t_{i,1}], [s_{i,2}, t_{i,2}], \ldots [s_{i,Ti}, t_{i,Ti}]\} \quad \text{Equation (1)}$$

where for each tuple k, $T_{i,k}=[s_{i,k}, t_{i,k}]$, link $l_i$ becomes active from time $s_{i,k}$ to $t_{i,k}$. It is assumed that the tuples are non-overlapping and ordered in time, i.e., $s_{i,k} \leq t_{i,k} < s_{i,k+1}$. In addition, it is assumed that the transmission is normalized to 1, i.e., $0 \leq s_{i,1}$ and $t_i, T_i \leq 1$. Transmission schedules $\pi_i$'s of all links $I_i$'s are synchronized in time.

3b. AP-to-Client Associations

Each client is associated with an AP to send and receive data in the WLAN, and thus, each AP may have one or more clients associated therewith. The AP-to-client associations are the client(s) associated with each AR In one example, signal strength or other metrics may be used to determine which AP a client is to associate with. The standard being used in the WLAN may set forth a protocol for associating clients with an AP. In one embodiment, the AP-to-client associations do not change throughout the channel assignment. A cell is an AP and its associated clients. A cell is also referred to as a basic service set.

3c. Node-to-Node Interference Relationships

The interference relationships are predetermined. For example, clients interfere with each other if they are associated with different APs but communicate on the same channel and are in close enough proximity to "hear" each other's communications. The same may apply for APs that communicate on the same channel and are in close proximity.

A more formal description of interference relationships is as follows. If nodes $v_i$ and $v_j$ have an interference link $I_{i,j}$ that is an element of L, it means that they are interfering with each other when they are operating in the same channel. The interference link $I_{i,j}$ may be bi-directional. Note that the interference link is effective only when the two nodes $v_i$ and $v_j$ are in the same channel. When two nodes are operating in different channels, there is no interference between them.

If nodes $v_i$ and $v_j$ have an edge $e_k=(i; j) \in E$ between them in the undirected graph $G=(V;E;L)$ representing the WLAN, and the nodes operate in overlapping channels but do not have a communication link (i.e., AP-to-clients association) between them, then they are interfering with each other. $e(i; j)$ existing and having $v_i$ and $v_j$ assigned to overlapping channels means that either: 1) concurrent transmissions of the two nodes are avoided by carrier sensing; or 2) one node's transmission interferes with the other node's reception (hidden interference). In other words, when one is transmitting, the other cannot transmit or receive data. They can receive data at the same time. Interference may be defined based on node-to-node signal reception.

Given the previous defined transmission schedule, node interference E and channel assignment, interference between a pair of links, $I_1$: $v_{s1}-v_{r1}$ and $I_2$: $v_{s2}-v_{r2}$ may be defined as follows. First, when $I_1$ and $I_2$ share a node (such as two links stemmed from one AP), the two links cannot be active at the same time (uni-cast transmissions). In other words, if $v_{s1}=v_{s2}$, $v_{s1}=v_{r2}$, $v_{r1}=v_{s2}$, or $v_{r1}=v_{r2}$, then $\pi_1$ and $\pi_2$ does not overlap. Second, when the two links do not share a node in common, if e(s1; s2), e(s1; r2) or e(s2; r1) exists and $I_1$ and $I_2$ operate in the same channel, then $I_1$ and $I_2$ interfere with each other if their schedules $\pi_1$ and $\pi_2$ overlap. $v_{r1}$ and $v_{r2}$ may receive at the same time even if the two nodes are connected by an edge e(r1; r2).

3d. Set of Available Channels

The set of available channels used by the channel assignment process may be set forth by the standard being used for the WLAN. The set of available channels is C, and the number of channels in the set is c. Because of 802.11n channel bonding, not all c channels are orthogonal. For example, given four orthogonal 20 MHz channels of {36; 40; 44; 48}, 802.11n allows two more bonded 40 MHz channels of {36+40; 44+48}. The possible channel bonding combinations are given by the 802.11n standard, such as 36+40 is possible but 40+44 is not. As a result, six channels in total (four 20 MHz channels and two 40 MHz channels) may be in the set of available channels. Interference can happen between two nodes if they are in the same channel or their channel share a common sub-channel. For instance, a node in 36 and another in 36+40 can interfere with each other. 36+40 and 44+48 are orthogonal.

The output of the channel assignment process is a channel assignment, which is a channel from the channel set assigned to each AP. The goal is to determine the best channel assignment that satisfies a given performance objective, such as maximizing throughput fairness amongst various clients or maximizing the aggregate throughput of the wireless network. The channel assignment includes assigning each AP a channel in the set of available channels.

3e. Normalized Throughput $f_i$ is a normalized throughput of client i. The normalized throughput $f_i$ is normalized, for example, by the maximum link throughput with a 20 MHz channel. The normalized throughput is not the actual throughput. For a 40 MHz bonded channel, the maximum normalized throughput increases by a gain factor, which is normally 1.6. The normalized throughput or actual throughput may be used to calculate MaxMin and/or MaxSum.

$d_i$ is a transmission and reception duration of a node $v_i$. Each node has two valid links to communicate with its AP, $I_u$ and $I_d$ for uplink and downlink communications, respectively. $d_i$ may be derived from transmission schedules $\pi_u$ and $\pi_d$ of the links $I_u$ and $I_d$:

$$d_i = \Sigma_{k=1}^{T_u}(t_{u,k} - s_{u,k}) + \Sigma_{k=1}^{T_u}(t_{d,k} - s_{d,k})$$  Equation (2)

802.11 MAC parameters such as frame size, bit rate, header size, and the other overhead times (e.g., acknowledgment) affect the normalized throughput $f_i$. According to an embodiment, a MAC function considers only the effect of channel bonding. If a 40 MHz channel is assigned for $v_i$, $f_i$ is derived from $d_i$ as $f_i = d_i * G_{40MHz}$, otherwise $f_i = d_i$ (if a 20 MHz channel is assigned for client i).

Because 40 MHz channel bonding provides a larger communication pipe than a 20 MHz channel by a factor of $G_{40MHz}$ (e.g., 1.6), the transmission and reception duration $d_i$ required to handle the traffic rate (throughput) $f_i$ is multiplied by $G_{40MHz}$. Because $d_i$ is a time normalized metric, $d_i$ cannot be larger than one. However, $f_i$ can be larger than one if a 40 MHz channel is used.

4. Objective Functions

The output of the channel assignment process is a set of channel assignments for APs and transmission schedules for all links. The goal is to find the best channel assignments and interference-free transmission schedules that satisfy a given performance objective, such as MaxSum or MaxMin. Transmission schedules are also produced as part of the optimization. According to an embodiment, various performance objectives are considered. One objective is to determining a MaxSum for the network. The MaxSum is defined as a maximization of a system throughput in the network. The system throughput is the sum of throughput of all nodes (or a set of nodes) in the network. When $f_i$ is a normalized throughput of client I, the MaxSum may be expressed as a function of:

$$\max \Sigma_{\forall vi \in S} f_i$$  Equation (3)

Another objective is to determine a MaxMin. The MaxMin is defined as a maximization of the minimum throughput of all communication links for the APs and associated clients between time $s_{j,k}$ and time $t_{j,k}$. The MaxMin may be expressed as a function of:

$$\max\{\min_{\forall ij \in L} \Sigma_{k=1}^{T_j}(t_{j,k} - s_{j,k})\}$$  Equation (4)

4a. MaxSum

Determining MaxSum is NP-hard via a reduction from the independent set problem. Independent set (IS) is a set of nodes that does not have an edge e(i; j)∈E between any two nodes vi; vj in the set of nodes V'. The IS optimization problem is the problem of finding the largest subset of nodes V' ⊂ V in an undirected graph G=(V; E) such that there does not exist an edge e(i; j)∈E between any two nodes vi; vj in V' (independent set), and the cardinality of the subset |V'| is maximized. The IS optimization problem is the problem of deciding whether an independent set of cardinality K exists. MaxSum includes IS as a special case, hence MaxSum is NP-hard.

In one embodiment, for each instant of IS, an instant of MaxSum is constructed as follows. First, make only one channel available, so that all APs and clients are assigned to the same channel. Second, the same set of nodes V in IS will be reused as the set of clients in MaxSum. Third, each client will have its own AP serving it, and there exist communication/interference edges from each AP to all other APs. Fourth, the same set of edges E in the IS is reused as the set of communication/interference edges among clients in MaxSum.

The following assumptions apply to determine MaxSum. There exists an independent set of size K in the IS if and only if there is a throughput of K in MaxSum. If there is an IS of size K, then the same corresponding set of clients can transmit simultaneously for all time 0≦t≦1 without interference, resulting in a throughput of K. Conversely, if there is a throughput of K, there exists an instant t, 0≦t≦1, where there are at least K simultaneously transmitting nodes (otherwise throughput of K cannot be achieved). At such instant t, any K nodes simultaneously transmitting must be K non-interfering clients (a single transmitting AP will prevent all other APs from transmitting or receiving data, resulting in one simultaneously transmitting node, not K). Hence the K nodes in an IS corresponding to the K simultaneously transmitting STAs may form a size-K independent set.

A couple insights of MaxSum is i) that one of the keys in MaxSum is, for a given channel, finding the largest independent set of AP-client links (those that can be active at the same time without interference), which turns out to be NP-hard; and ii) that given the largest independent set of AP-client links has been found for a given channel, one can do no better in throughput for this channel than scheduling this independent link set to be active for all time 0≦t≦1.

4b. MaxMin

Determining MaxMin problem is NP-hard via a reduction from a K-colorable (COL) problem or a greedy coloring process. For example, the problem of determining MaxMin may be represented as COL optimization problem or a greedy coloring process problem. A COL optimization problem is the problem of finding the smallest number of distinct colors required to color each node in an undirected graph G=(V;E) so that no two nodes $v_i$; $v_j$ in V that are connected by an edge e(i; j)∈E are of the same color.

In one embodiment, for each instant of MaxMin, a corresponding instant of COL is constructed as follows. First, make only one channel available, so all APs and STAs are assigned to the same channel. Second, the set of only uplinks from L in MaxMin will be reused as the set of nodes V in COL. Third, each client will have its own AP serving it, and there exist communication/interference edges from each AP to all other APs. Fourth, the interference relations between the communication uplinks in MaxMin will be used to form the set of edges E in COL. A graph G is K-colorable if and only if the corresponding MaxMin instance has at least max-min link throughput 1/K. It is clear that if G is K-colorable, then communication links of the same color may be scheduled for transmission simultaneously without causing interference. If links of each color are scheduled for transmission in turn for the same duration each, then the throughput of each link is exactly 1/K.

Suppose the max-min link throughput of G is M/B, where, without loss of generality, B is the number of link sets in a transmission cycle $V_1, V_2, \ldots, V_B$, and M is the minimum number of times any link appears in the cycle. In other words, links in $V_1$ transmit simultaneously without interference for duration 1/B, followed by links in $V_2$, and so on. Suppose further that M/B is at least as large as 1/K for some integer number K:

$$1/K \leq M/B \qquad \text{Equation (5)}$$

Figure 2:
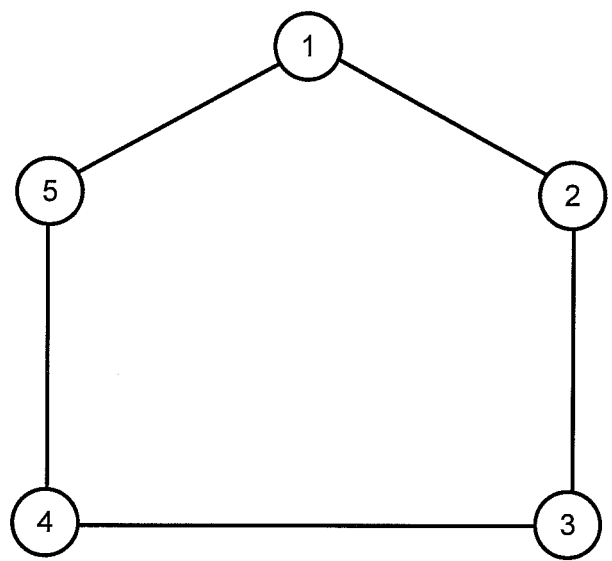
FIG. 2 shows an example for a MaxMin throughput, according to an embodiment of the present invention.

By way of an example, consider the graph in FIG. 2. One transmission cycle would be {{1,3}, {2,4}, {3,5}, {4,1}, {5,2}}. It is that B=5 and M=2 and max-min throughput is 2/5.

The max-min throughput of a given conflict graph G (determined by a given channel assignment) is driven by the chromatic number of the conflict graph G: if G is K-colorable, the max-min link throughput of the given channel assignment is lower-bounded by 1=K. Here, the conflict graph G is composed by the set of communication links {l} and the interference relations between the links are based on the given channel assignment. The set of communication links {l} corresponds to a set of vertices {v} in the conflict graph G and the interference relations determine the edges among {v} in G. In one embodiment, because finding the chromatic number X(G)=K of a given conflict graph G is NP-hard, a heuristic routine greedy coloring process that finds X(G) may be used and 1/X(G) may be used as the max-min link throughput for a given channel assignment.

A greedy coloring process considers the vertices of G in a specific order $\{v_1, \ldots, v_n\}$ and assigns colors to vertices in the order. The greedy coloring process assigns to $v_n$ the lowest-indexed (available) color not used by its lower-indexed neighbors, adding a new color if needed. If the vertices are ordered according to their degrees, the resulting greedy coloring uses at most $\max_i \min\{d(v_i)+1, i\}$ colors, at most one more than the graph's maximum degree ($\Delta(G)$), where $d(v_i)$ is the degree of $v_i$. Thus, the upper bound, $\Delta(G)+1$ may be used to compute the max-min link throughput lower bound as $1/(\Delta(G)+1)$. Thus, a heuristic process for MaxMin to assign channels to APs may be developed such that the max-min link throughput tends to be the largest. The concepts of an AP $x_i$'s interfering APs is defined as a set of APs i) that have an edge with $x_i$ or $x_i$'s clients or ii) that any of their clients have an edge with $x_i$ or $x_i$'s clients.

5. Methods

Figure 3:
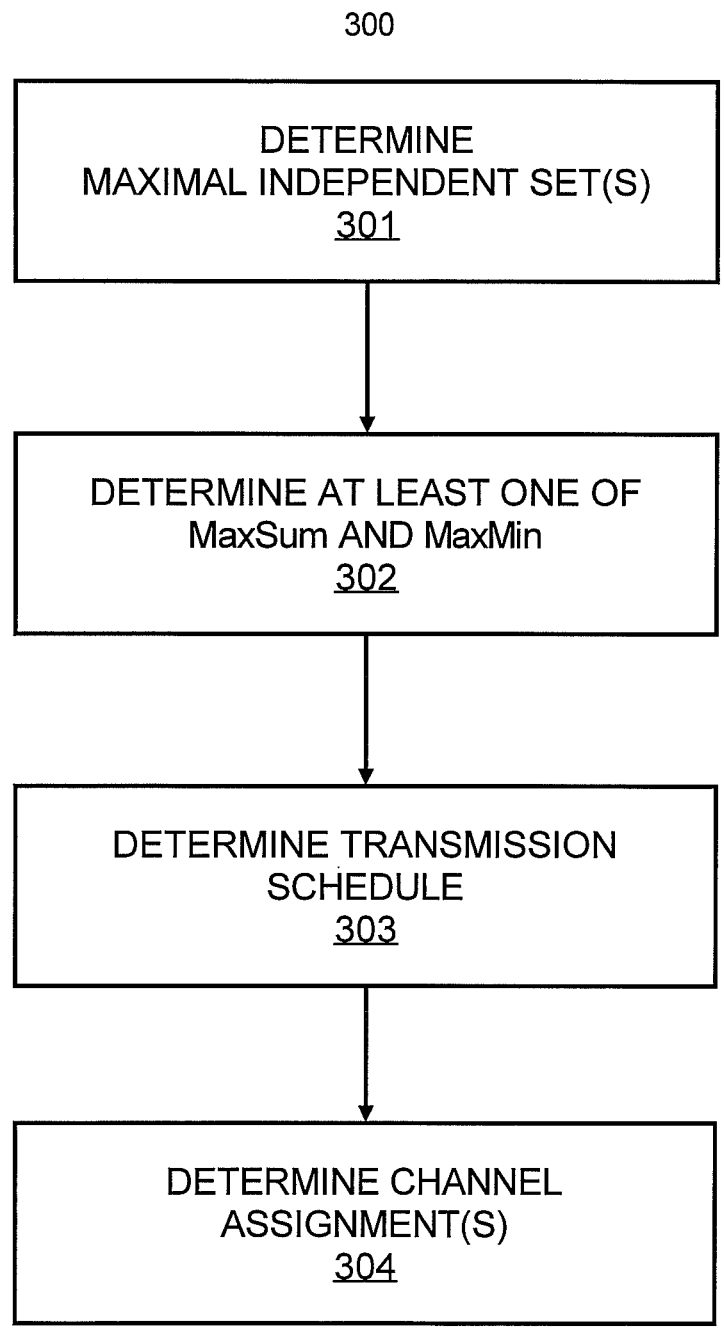
FIG. 3 illustrates a flowchart of a method for determining a channel assignment, according to an embodiment of the present invention.

FIG. 3 illustrates a flowchart of a method 300 for determining a channel assignment for APs in a wireless network, such as a WLAN, while mitigating interference. The method 300 assumes the clients are already associated with APs, and all clients associated with a particular AP communicate on the same channel and there is a given set of channels that are used for the channel assignment. The method 300 is described with respect to the system 100 shown in FIG. 1 by way of example and not limitation.

At step 301, a maximal independent set of AP-client links for a given channel assignment is determined. The maximal independent set of AP-client links for a given channel assignment is determined to determine a MaxSum as described herein below. The maximal independent set of AP-client links includes a set of maximum number of nodes communicating data simultaneously without interfering each other nodes. To determine the maximal independent set, an aggregate throughput of each of plurality of independent sets for the channel is determined and an independent set having a maximum aggregate throughput is selected from the plurality of independent sets as the maximal independent set. A set of AP-client links for a given channel in the network may already be known or may be determined before determining the maximal independent set of AP-client links. The AP-client link is a link between an AP and a client associated with the AP. An initial channel assignment is selected assigning a channel to each AP in the WLAN. The channel assignment may be a random channel assignment. In one embodiment, the channel assignment includes assigning 802.11n bonded channels to APs and assigning one of the 40 MHz bonded channels to each AP as an initial assignment.

At step 302, at least one of a MaxSum and a MaxMin is determined. The MaxSum is a maximization of a system throughput. The system throughput is a sum of throughput of nodes in the network The MaxMin is a maximization of a minimum throughput of set of AP-client links in the network.

At step 303, a transmission schedule for the nodes (set of AP-client links) is determined based on the maximal independent set. The nodes of the set of maximum number of nodes in the maximal independent set transmit data based on the transmission schedule. The nodes transmit data if the nodes are in the maximal independent set, however, the nodes may not transmit data if the nodes are not in the maximal independent set. The transmission schedule is evenly distributed transmission schedule. Determining a transmission schedule for the node includes assigning different time slots to different nodes (set of AP-client links) and each of the different time slots has a same length of time.

At step 304, a channel assignment for the APs is determined based on at least one of the MaxSum and the MaxMin. The channel assignment is assigning a channel to each AP or assigning each AP to a channel in the WLAN. For example, a channel is assigned to one of the APs in the interference relationship. In one example, a channel assignment is selected that improves the throughput for the nodes and their neighboring APs.

Figure 4:
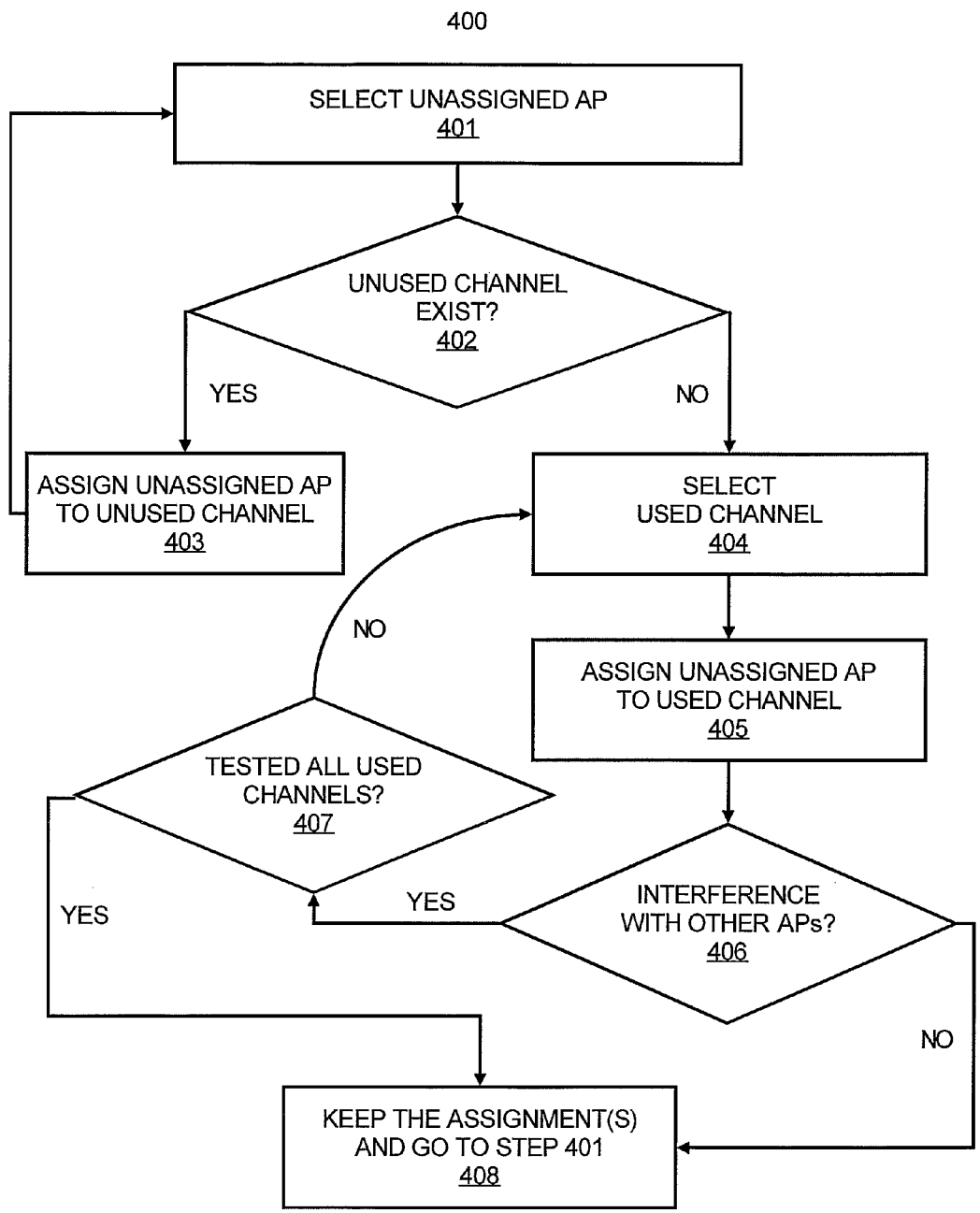
FIG. 4 illustrates a flowchart of a method for determining a channel assignment using a MaxSum, according to an embodiment of the present invention.

FIG. 4 illustrates a flowchart of a method 400 for determining a channel assignment for APs using a MaxSum in a wireless network, such as a WLAN, for mitigating interference. The method 400 assumes that there is a given set of channels that are used for the channel assignment. The method 400 is described with respect to the system 100 shown in FIG. 1 by way of example and not limitation.

At step 401, an unassigned AP is selected. If all the APs are assigned to channels, this process stops.

At step 402, a determination as to whether there is an unused channel is made.

At step 403, the unassigned AP to an unused channel is assigned if there is an unused channel. After assigning the unassigned AP to an unused channel, go back to step 401 for selecting another unassigned AP. The assignment of the unassigned AP to the unused channel made in step 403 may be kept.

At step 404, a used channel is selected from a plurality of channels if an unused channel does not exist.

At step 405, assign the unassigned AP to the used channel.

At step 406, a determination as to whether assigning the unassigned AP to the used channel causes interference for other APs is made. If the assignment of the unassigned AP to the used channel causes interference for other APs, repeats the steps of selecting a used channel, assigning the unassigned AP to the used channel and determining the interference until there is no interference for other APs.

At step 407, repeat the steps 404-406 for all used channels one by one until all used channels are tried.

At step 408, the assignment of the unassigned AP to the used channel is kept when there is no interference for other APs. After assigning the unassigned AP to the used channel and saving the assignment, the process may go back to step 401.

Figure 5A:
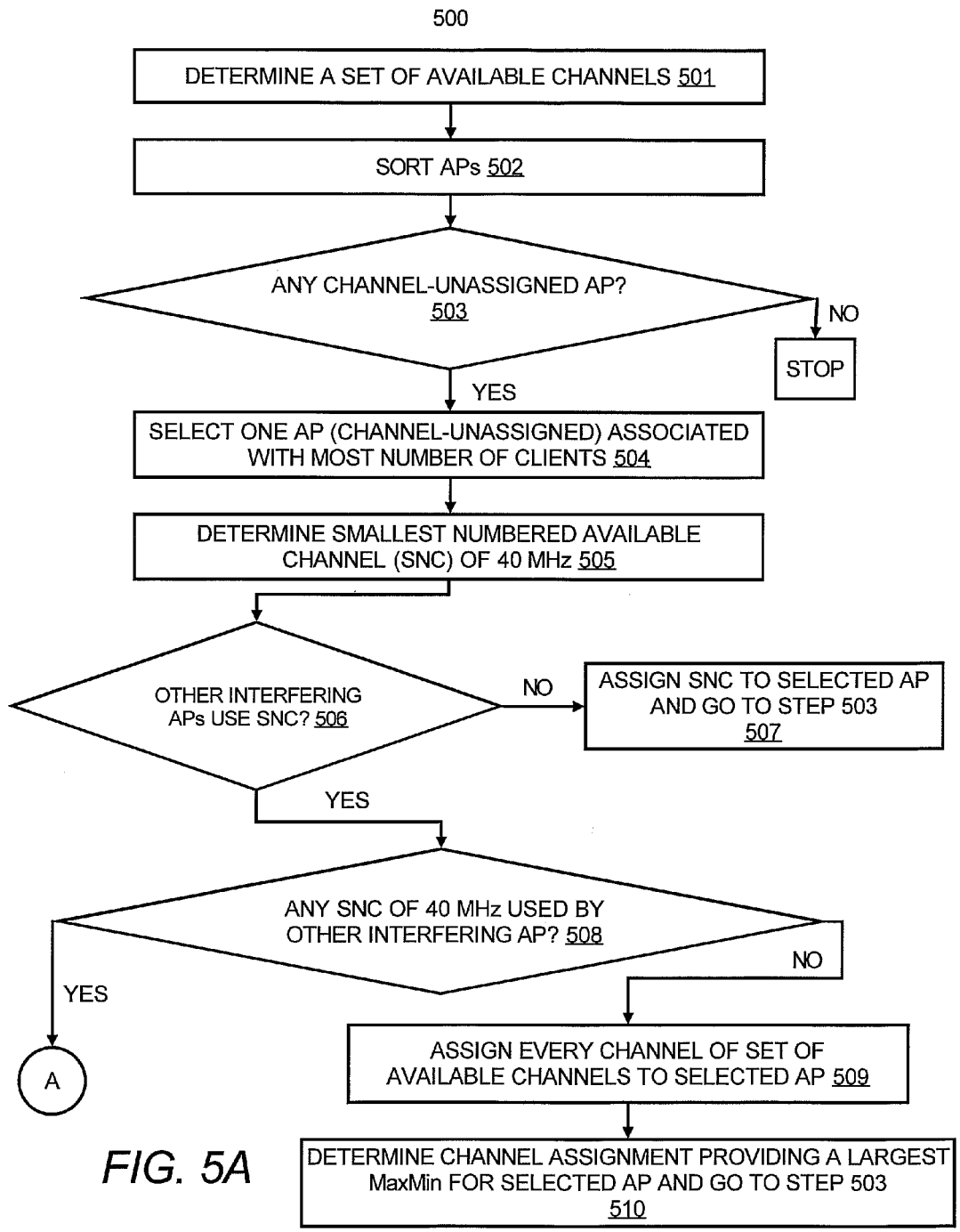
FIGS. 5A and 5B illustrate a flowchart of a method for determining a channel assignment using a MaxMin, according to an embodiment of the present invention.
Figure 5B:
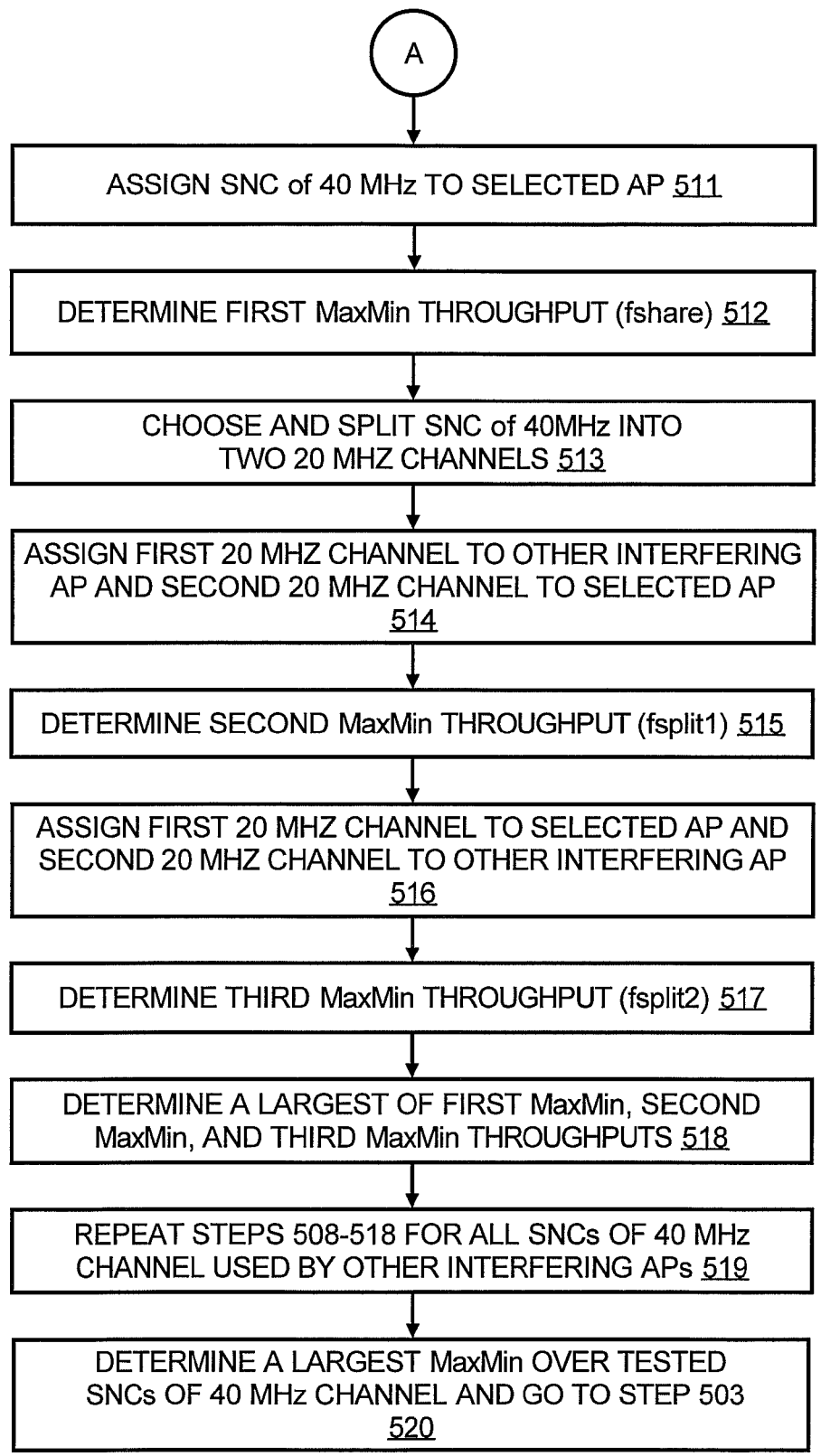

FIGS. 5A and 5B illustrate a flowchart of a method 500 for determining a channel assignment for APs using a MaxMin in a wireless network, such as a WLAN, for mitigating interference. The method 500 assumes that there is a given set of channels that are used for the channel assignment. The method 500 is described with respect to the system 100 shown in FIG. 1 by way of example and not limitation.

At step 501, a set of available channels is determined. As describe above the set of available channels used by the channel assignment process may be set forth by the standard being used for the WLAN.

At step 502, the APs are sort in a decreasing order of a number of clients associated with each of the APs for the set of available channels. In the decreasing order of a number of clients associated with, the AP that is associated with the most number of clients is placed first and the AP that is associated with the least number of clients is placed last.

At step 503, a determination as to whether an AP has been assigned to a channel made. Accordingly, channel-unassigned APs are determined.

At step 504, one of the channel-unassigned APs is selected and the selected AP has the most number of clients associated with among other channel-unassigned APs that were not selected before.

At step 505, a smallest numbered available channel (SNC) among the set of available channels is determined. The smallest numbered available channel becomes unavailable for non-selected APs after the smallest numbered available channel is assigned to the selected AP.

At step 506, a determination as to whether other APs interfering the selected AP use the smallest numbered available channel is made.

At step 507, if the other APs interfering the selected AP do not use the smallest numbered available channel, the smallest numbered available channel is assigned to the selected AP in the sorted APs and repeat the step 503-505 for remaining channel-unassigned APs and smallest numbered available channel.

At step 508, if the other APs interfering the selected AP use the smallest numbered available channel, a determination as to whether any smallest numbered available channel of a 40 MHz channel is used by the other APs interfering the selected AP is made.

At step 509, if the other APs interfering the selected AP does not use the smallest numbered available channel, and the smallest numbered available channel is a 40 MHz channel, every channel of the set of available channels is assigned to the selected AP.

At step 510, after every channel of the set of available channels is assigned to the selected AP, a channel assignment providing a largest MaxMin for the selected APs is determined. At this point, the process may go back to step 503.

At step 511, if the other APs interfering the selected AP use the smallest numbered available channel, and the smallest numbered available channel is a 40 MHz channel, the smallest numbered available channel is assigned to the selected AP.

At step 512, a first MaxMin of the network for the AP-client links is determined. The first MaxMin may be denoted as $f_{share}$. The first MaxMin may be determined by using a greedy coloring process described herein above.

At step 513, the smallest numbered available 40 MHz channel is split into two 20 MHz channels. The two 20 MHz channels includes a first 20 MHz channel and a second 20 MHz channel.

At step 514, the first 20 MHz channel is assigned to the other AP interfering the selected AP and the second 20 MHz channel is assigned to the selected AP.

At step 515, a second MaxMin of the network for the AP-client links is determined based on the assignment of the first 20 MHz channel to the other AP interfering the selected AP and the second 20 MHz channel to the selected AP. The second MaxMin may be denoted as $f_{spilt1}$. The second MaxMin may be determined by using a greedy coloring process described herein above.

At step 516, the first 20 MHz channel is assigned to the selected AP and the second 20 MHz channel is assigned to the other AP interfering the selected AP.

At step 517, a third MaxMin of the network for the AP-client links is determined based on the assignment of the first 20 MHz channel to the selected AP and the second 20 MHz channel to the other AP interfering the selected AP.

The third MaxMin may be denoted as $f_{split2}$. The third MaxMin may be determined by using a greedy coloring process described herein above.

At step 518, determining a largest of the first MaxMin ($f_{share}$), the second MaxMin ($f_{spilt1}$), and the third MaxMin ($f_{split2}$).

At step 519, the steps 508-518 are repeated for the selected AP for every smallest numbered available channel used by other APs interfering the selected AP.

At step 520, a channel assignment is determined based on the largest of the first MaxMin ($f_{share}$), the second MaxMin ($f_{split1}$), and the third MaxMin ($f_{split2}$). If the largest of the first MaxMin ($f_{share}$), the second MaxMin ($f_{split1}$), and the third MaxMin ($f_{split2}$) is greater than an existing largest MaxMin, the largest of the first MaxMin ($f_{share}$), the second MaxMin ($f_{split1}$), and the third MaxMin ($f_{split2}$) is a new largest MaxMin. After determining the channel assignment, the process may go back to step 503.

The methods, 300, 400, and 500 is performed by a computer system. In one embodiment, methods, 300, 400, and 500 may be performed by a single channel assignment module (e.g., channel assignment module 110a) in an AP or distributed among multiple channel assignment modules in multiple APs. In another embodiment, the methods, 300, 400, and 500 is performed by a computer system other than AP.

6. Computer System

A computer system may be used as a platform to execute one or more computer programs performing the methods, steps and functions described herein. The one or more computer programs are stored in one or more computer readable storage mediums, which are storage devices.

The computer system may include a processor configured to execute the computer programs and memory storing the computer programs during runtime.

Some or all of the operations set forth in the methods and functions described herein may be contained as one or more computer programs stored in any desired computer readable storage medium and executed by a processor on a computer system. Exemplary computer readable storage media that may be used to store the software and may include Random Access Memory (RAM), Read Only Memory (ROM), Electrically Programmable Read Only Memory (EPROM), Electrically Erasable Programmable Read Only Memory (EEPROM), hard disks, or other data storage devices.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, wherein the invention is intended to be defined by the following claims and their equivalents in which all terms are mean in their broadest reasonable sense unless otherwise indicated.

What is claimed is:

1. A method for assigning channels to access points (APs) in a wireless network, the method comprising:
    determining, by a computer system, at least one of a MaxSurn and a MaxMin, wherein the MaxSum is a maximization of a system throughput, and wherein the system throughput is a sum of throughput of nodes in the network, and wherein the MaxMin is a maximization of a minimum throughput of a set of AP-client links in the network, and wherein the AP-client link is a link between an AP and a client associated with the AP; and
    determining a channel assignment for the APs based on at least one of the MaxSum and the MaxMin.

2. The method of claim 1, further comprising:
    assigning the APs to channels from the channel assignment determined based on at least one of the MaxSum and the MaxMin.

3. The method of claim 1, further comprising:
    determining a maximal independent set of AP-client links for a given channel assignment for determining the MaxSum, wherein the maximal independent set of AP-client links includes a set of maximum number of nodes communicating data simultaneously without interfering each other nodes.

4. The method of claim 3, further comprising:
    determining a transmission schedule for the nodes in the network based on the maximal independent set, wherein nodes of the set of maximum number of nodes in the maximal independent set transmits data based on the transmission schedule.

5. The method of claim 3, wherein the system throughput is measured from the sum of throughput of the maximal independent sets of AP-client links.

6. The method of claim 1, wherein determining the MaxSum further comprises:
    selecting an unassigned AP;
    assigning the unassigned AP to an unused channel if there is an unused channel;
    selecting a used channel from a plurality of channels if an unused channel does not exist;
    assigning the unassigned AP to the used channel;
    determining if assigning the unassigned AP to the used channel causes an interference for other APs; and
    repeating the steps of selecting a used channel, assigning the unassigned AP to the used channel and determining the interference until there is no interference for other APs.

7. The method of claim 1, wherein determining the MaxMin further comprises:
    determining a set of available channels;
    selecting one of the APs, wherein the selected AP has the most number of clients associated with, and wherein the APs were not selected previously;
    assigning a smallest numbered available channel among the set of available channels to the selected AP in the APs, wherein the smallest numbered available channel becomes unavailable for non-selected APs after assigning the smallest numbered available channel to the selected AP;
    repeating assigning a smallest numbered available channel to the selected AP; and
    determining a channel assignment for the APs based on assigning a smallest numbered available channel to the selected AP, wherein the channel assignment provides a largest MaxMin for the selected AP.

8. The method of claim 7, further comprising:
    sorting the APs in a decreasing order of a number of clients associated with each of the APs for the set of available channels; and
    selecting one of the APs in a decreasing order of a number of clients associated with each of the APs.

9. The method of claim 7, wherein the smallest numbered channel is a 40 MHz channel and is not used by other AP interfering the selected AP.

10. The method of claim 7, wherein the smallest numbered channel is a 40 MHz channel and used by other AP interfering the selected AP, and wherein assigning a smallest numbered available channel further comprises:
    determining a first MaxMin for the network;
    splitting the smallest numbered available channel into two 20 MHz channels, wherein the two 20 MHz channels includes a first 20 MHz channel and a second 20 MHz channel;
    assigning the first 20 MHz channel to the other AP interfering the selected AP and the second 20 MHz channel to the selected AP;
    determining a second Max Mm for the network;
    assigning the first 20 MHz channel to the selected AP and the second 20 MHz channel to the other AP interfering the selected AP;
    determining a third MaxMin for the network; and
    determining a largest of the first MaxMin, the second MaxMin, and the third MaxMin.

11. The method of claim 10, wherein determining the first MaxMin, the second MaxMin and the third MaxMin for the network uses a greedy coloring process.

12. The method of claim 1, wherein the channel assignment includes at least one 802.11 n bonded channel.

13. A computer system configured to assign channels to access points (APs) in a wireless network, the computer system comprising:
    a processor configured to
        determine at least one of a MaxSum and a MaxMin, wherein the MaxSum is a maximization of a system throughput, and wherein the system throughput is a sum of throughput of nodes in the network, and wherein the MaxMin is a maximization of a minimum throughput of a set of AP-client links in the network, and wherein the AP-client link is a link between an AP and a client associated with the AP; and determine a channel assignment for the APs based on at least one of the MaxSum and the MaxMin; and a data storage device storing the set of AP-client links, the MaxSum, the MaxMin, a maxitnal independent set, a set of available channels, and the channel assignment.

14. The computer system of claim 13, wherein the processor is configured to determine a maximal independent set of AP-client links for a given channel assignment for determining the MaxSum, and to determine a transmission schedule for the nodes in the network based on the maximal independent set, wherein the maximal independent set of AP-client links includes a set of maximum number of nodes communicating data simultaneously without interfering each other nodes, and wherein nodes of the set of maximum number of nodes in the maximal independent set transmits data based on the transmission schedule.

15. The computer system of claim 13, wherein the processor is configured to select an unassigned AP, to assign the unassigned AP to an unused channel if there is an unused channel, to select a used channel from a plurality of channels if an unused channel does not exist, to assign the unassigned AP to the used channel, to determine if assigning the unassigned AP to the used channel causes an interference for other APs, and to repeat the steps of selecting a used channel, assigning the unassigned AP to the used channel and determining the interference until there is no interference for other APs.

16. The computer system of claim 13, wherein the processor is configured to determine a set of available channels, to select one of the APs, to assign a smallest numbered available channel among the set of available channels to the selected AP in the APs, to repeat assigning a smallest numbered available channel to the selected AP, and to determine a channel assignment for the APs based on assigning a smallest numbered available channel to the selected AP, wherein the selected AP has the most number of clients associated with among APs and wherein the APs were not selected previously, and wherein the smallest numbered available channel becomes unavailable for non-selected APs after assigning the smallest numbered available channel to the selected AP, and , wherein the channel assignment provides a largest MaxMin for the selected AP.

17. The computer system of claim 16, wherein the processor is configured to sort the APs in a decreasing order of a number of clients associated with each of the APs for the set of available channels and to select one of the APs in a decreasing order of a number of clients associated with each of the APs.

18. The computer system of claim 16, wherein the smallest numbered channel is a 40 MHz channel and is not used by other AP interfering the selected AP.

19. The computer system of claim 16, wherein the smallest numbered channel is a 40 MHz channel and used by other AP interfering the selected AP, and wherein the processor is configured to assign a smallest numbered available channel, to determine a first MaxMin for the network, to split the smallest numbered available channel into two 20 MHz channels, wherein the two 20 MHz channels includes a first 20 MHz channel and a second 20 MHz channel, and wherein the processor is further configured to assign the first 20 MHz channel to the other AP interfering the selected AP and the second 20 MHz channel to the selected AP, to determine a second MaxMin for the network, to assign the first 20 MHz channel to the selected AP and the second 20 MHz channel to the other AP interfering the selected AP, to determine a third MaxMin for the network, and to determine a largest of the first MaxMin, the second MaxMin, and the third MaxMin.

20. A computer readable storage medium storing software that when executed by a processor performs a method for assigning channels to access points (APs) in a wireless network, the method comprising:

determining at least one of a MaxSum and a MaxMin, wherein the MaxSum is a maximization of a system throughput, and wherein the system throughput is a sum of throughput of nodes in the network, and wherein the MaxMin is a maximization of a minimum throughput of a set of AP-client links in the network, and wherein the AP-client link is a link between an AP and a client associated with the AP; and determining a channel assignment for the APs based on at least one of the MaxSum and the MaxMin.

* * * * *

UNITED STATES PATENT AND TRADEMARK OFFICE
CERTIFICATE OF CORRECTION

PATENT NO.         : 8,531,956 B2
APPLICATION NO.    : 12/790814
DATED              : September 10, 2013
INVENTOR(S)        : Jung Gun Lee et al.

It is certified that error appears in the above-identified patent and that said Letters Patent is hereby corrected as shown below:

In the Claims

In column 11, lines 28-29, in Claim 1, delete "MaxSurn" and insert -- MaxSum --, therefor.

In column 12, line 44, in Claim 10, delete "Max Mm" and insert -- MaxMin --, therefor.

In column 12, line 55, in Claim 12, delete "802.11 n" and insert -- 802.11n --, therefor.

In column 13, line 4, in Claim 13, delete "maxitnal" and insert -- maximal --, therefor.

Signed and Sealed this
Fifteenth Day of April, 2014

Michelle K. Lee
*Deputy Director of the United States Patent and Trademark Office*